United States Patent [19]

Maeda et al.

[11] Patent Number: 5,129,507
[45] Date of Patent: Jul. 14, 1992

[54] ROLLER CONVEYOR

[75] Inventors: Toshio Maeda, Inuyama; Yoshihiko Fujio, Komaki, both of Japan

[73] Assignee: Daifuku Co. Ltd., Japan

[21] Appl. No.: 665,843

[22] Filed: Mar. 7, 1991

[30] Foreign Application Priority Data

| Mar. 8, 1990 | [JP] | Japan | 2-57543 |
| Mar. 8, 1990 | [JP] | Japan | 2-57544 |
| Mar. 8, 1990 | [JP] | Japan | 2-57545 |
| Mar. 8, 1990 | [JP] | Japan | 2-57546 |
| Oct. 9, 1990 | [JP] | Japan | 2-271675 |

[51] Int. Cl.⁵ .......................................... B65G 13/06
[52] U.S. Cl. ..................... 198/781; 198/789; 198/861.1
[58] Field of Search ............ 198/789, 791, 781, 861.1; 193/35 R

[56] References Cited

U.S. PATENT DOCUMENTS

| 3,263,951 | 8/1966 | Stokes | 198/861.1 X |
| 3,586,142 | 6/1971 | Inwood et al. | 193/35 R |
| 4,185,735 | 1/1980 | Hammond | 198/789 |
| 4,311,226 | 1/1982 | Thompson et al. | 193/35 R |
| 4,572,358 | 2/1986 | Swain | 198/789 X |
| 4,815,588 | 3/1989 | Katsuragi et al. | 198/789 X |

FOREIGN PATENT DOCUMENTS 0167106 6/1989 Japan ........................... 198/789

*Primary Examiner*—Robert P. Olszewski
*Assistant Examiner*—Cheryl L. Gastineau
*Attorney, Agent, or Firm*—Barnes, Kisselle, Raisch, Choate, Whittemore & Hulbert

[57] ABSTRACT

A roller conveyor in which articles are supported by idler rollers carried by a main frame and conveyed as the idler rollers are driven into rotation. A plurality of first idler rollers are arranged in one of two side frames of the main frame. A plurality of second idler rollers capable of supporting articles in pair with the first idler rollers are arranged in the other side frame. Driving force for conveying articles is given to the first idler rollers only. The fact that first idler rollers and second idler rollers are separately arranged at opposite sides assures that the first and second idler rollers are of short and light construction.

5 Claims, 16 Drawing Sheets

ROLLER CONVEYOR

TECHNICAL FIELD

The present invention relates to a roller conveyor for use in conveying, for example, a workpiece placed on a pallet.

BACKGROUND ART

Roller conveyors of this type have been known, a typical example of which is described in Japanese Patent Application Laid-Open Publication No. 57-160807. This known roller conveyor includes a main frame consisting of parallel rails, and a multiplicity of rollers carried by the main frame for free rotation only to form a conveyance track, with a casing mounted to the main frame through a support bracket or the like. The casing is provided with pins extending in the axial direction of the rollers, and on each of the pins are rotatably supported a wheel abuttable against a pair of adjacent rollers and a sprocket rotatable integrally with and positioned at outer side of the wheel. A drive chain supported and guided within the casing is in engagement with the sprockets. Between the casing and each pin is provided a diaphragm type drive means for vertically moving the pin.

According to the arrangement of the known roller conveyor, each wheel is rotated by the drive chain via the associated sprocket, and the rotation of the wheel is transmitted to the pair of rollers which are in abutment with the wheel. Thus, the multiplicity of rollers are rotated to enable articles to be conveyed on the conveyance track. Individual pins are moved upward and downward by controlling working fluid supply to and discharge from the associated diaphragms, so that the mode of operation is switched over from a driving mode in which each wheel is in abutment with adjacent rollers to a non-driving mode in which each wheel is separated from adjacent rollers and vice versa whereby a conveying force for individual articles is supplied or shut off. In this way, conveying operation is controlled to prevent individual articles from colliding with one another.

However, such arrangement involves a problem that when articles having a large width are to be conveyed, longer and heavier rollers are required, which in turn necessitates a main frame of greater rigidity and larger size. Another problem is that the increase in the weight of rollers requires a greater driving force to be given through each wheel. A further problem is that forceful inertial rotation occurs when driving is stopped, which fact requires the provision of a large number of stoppers for accurately stopping the run of articles.

SUMMARY OF THE INVENTION

It is a primary object of the invention to provide a roller conveyor in which the rollers and drive means therefor can be small in size and lightweight even when articles having a large width are to be conveyed, and in which other means can be disposed at central locations as viewed widthwise of the conveyor.

In order to accomplish the above object, according to the invention there is provided a roller conveyor comprising:
 a main frame having a left side frame and a right side frame,
 a plurality of first idler rollers carried by one of the side frames,
 a plurality of second idler rollers making pairs with the first idler rollers for supporting articles to be conveyed,
 transmission means engageable with and disengageable from said first idler rollers, and
 means for supplying a driving force to said transmission means.

According to such arrangement, first idler rollers and second idler rollers are arranged at opposite sides, right and left, so that the first and second idler rollers can be designed to be short in length and lightweight even when the roller conveyor is to be employed for conveying articles having a large width. Accordingly, the inertial rotational force of idler rollers can be reduced and, in addition, necessary means for drive force supply and the main frame can be made smaller in size. Therefore, articles being conveyed can be allowed to stop at a predetermined position without provision of any stopper means. A pallet for supporting an article thereon need not be designed to be of any special shape. Furthermore, a central portion of the conveyor as viewed in the transverse direction thereof can be utilized for mounting a power supply unit or the like thereon which may be advantageously employed for aging and other purposes.

DESCRIPTION OF THE PREFERRED EMBODIMENTS

Figure 1:
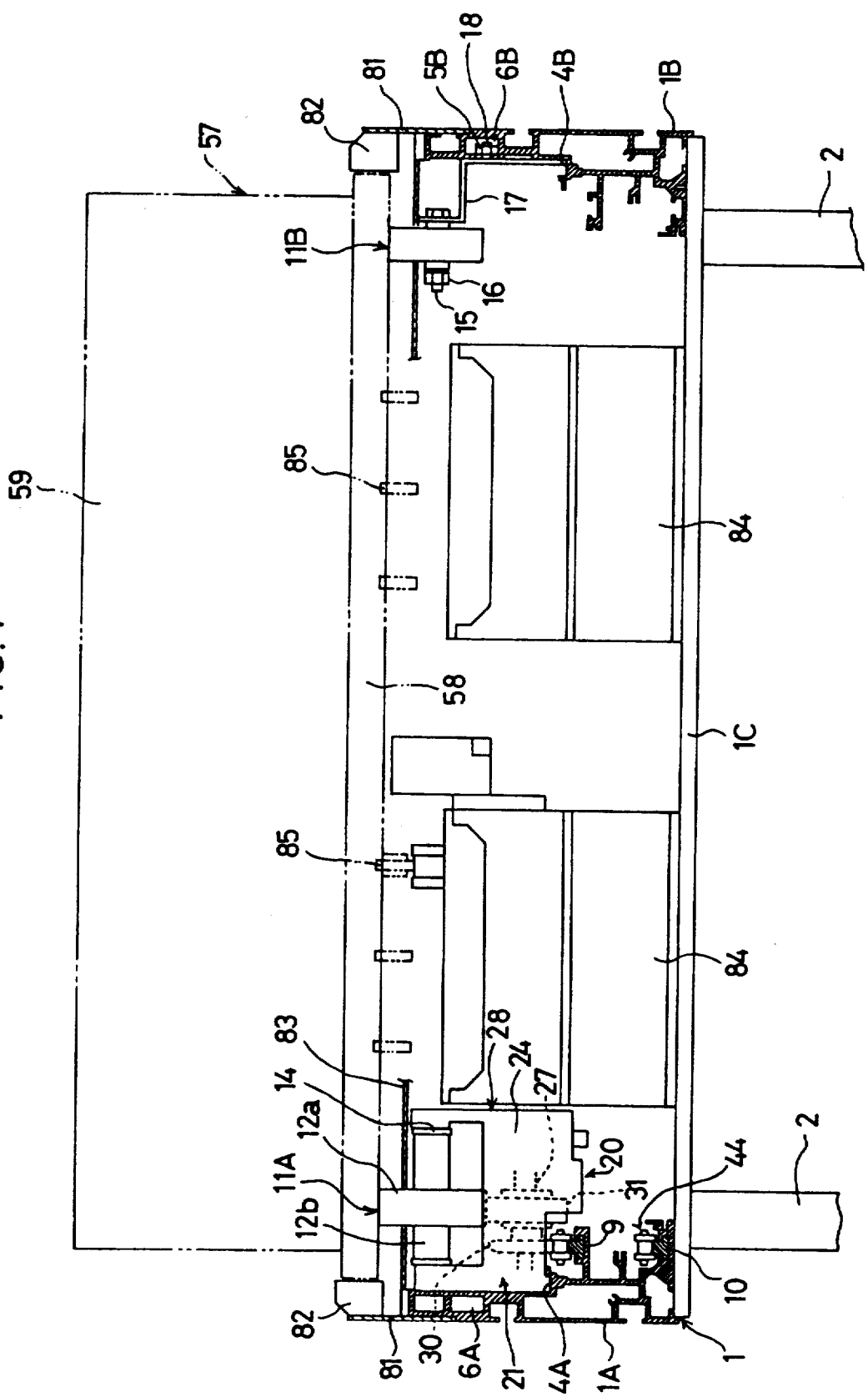
FIG. 1 is a cross-sectional view of a roller conveyor representing one embodiment of the invention.
Figure 2:
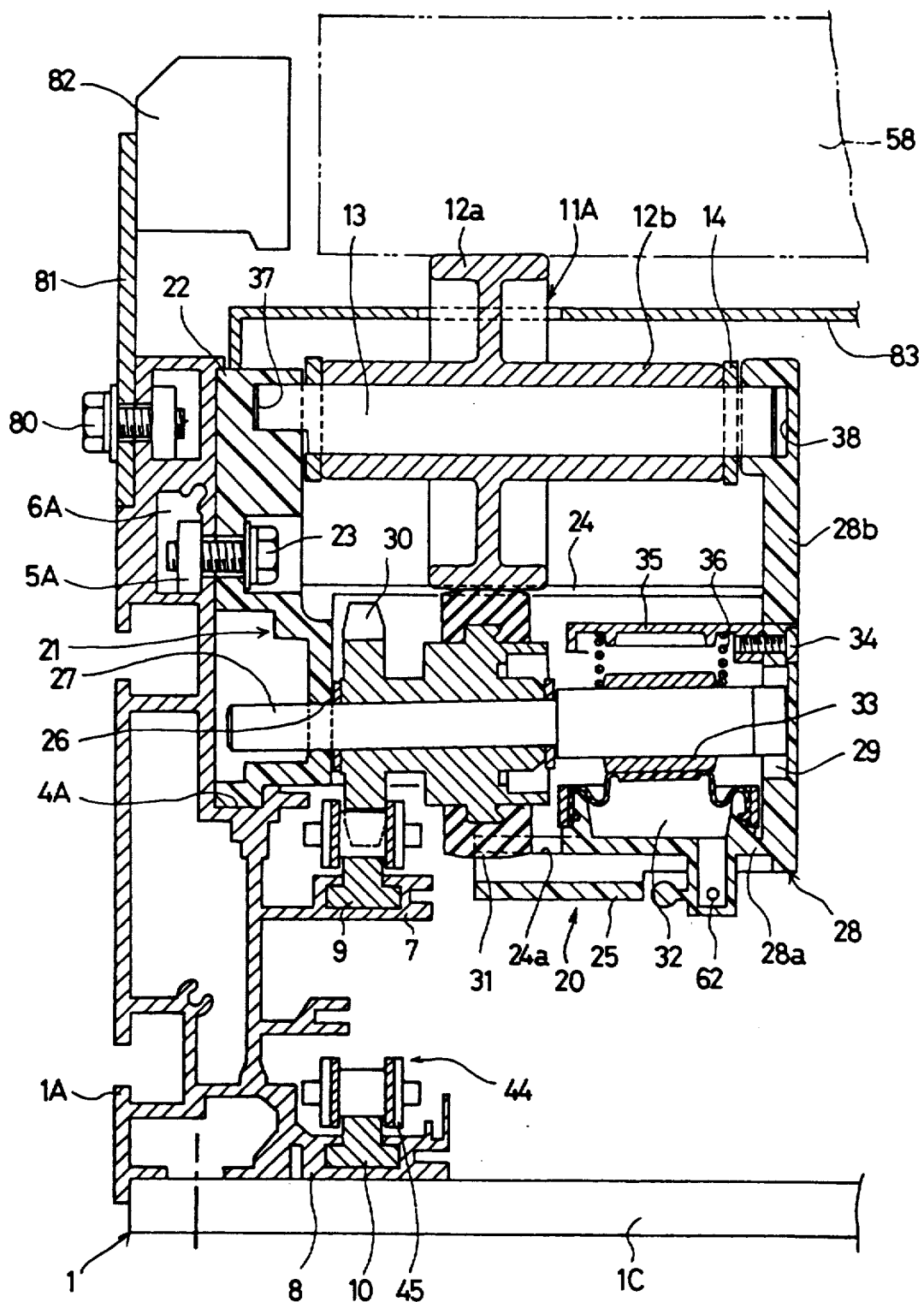
FIG. 2 is an enlarged sectional view showing a transmission gear and the perimeter thereof in FIG. 1.

In FIGS. 1 and 2, reference numeral 1 designates a main frame of U shape in section which comprises a pair of side frames 1A, 1B disposed at opposite sides, and a base frame 1C connecting the lower ends of the side frames 1A, 1B. The main frame 1 is placed at a predetermined level above the floor through a plurality of legs 2 connected to the base frame 1C. The side frames 1A, 1B are formed, in their opposed interior surfaces, with L-shaped guide portions 4A, 4B and, in respective upper portions thereof, with dovetail grooves 6A, 6B for allowing slide movement of nut members 5A, 5B in the longitudinal directions of the main frame 1. In the interior of lower portions of the one side frame 1A, a pair of guide rails 9, 10 extending longitudinally of the main frame 1 are installed through mounts 7, 8 respectively.

A plurality of pairs of idler rollers 11A, 11B, left and right, are arranged in position internally of the respective side frames 1A, 1B. The plurality of idler rollers 11A at one side are unitized individually with transmission gears 20 or braking units 50 as shown in FIG. 4.

Figure 4:
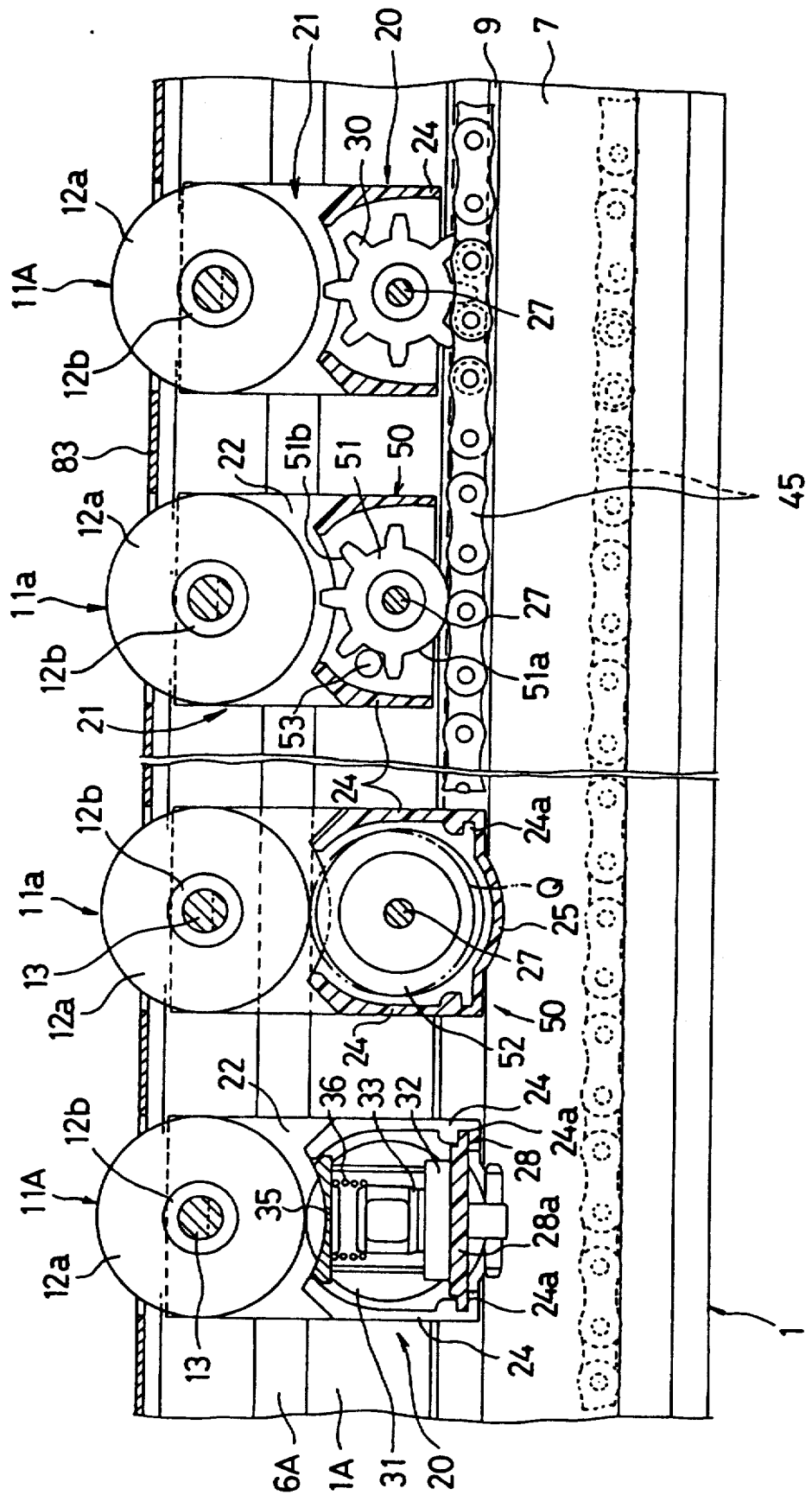
FIG. 4 is a partially cutaway side view showing a part of the roller conveyor.

Each transmission gear 20 has a case-shaped support frame 21 of resin material and a vertically extending base plate 22 as shown in FIGS. 2 and 4. The transmission gear 20 is so adapted that by fitting the lower end of the base plate 22 in the guide portion 4A and bringing a bolt 23 projecting through a median portion of the base plate 22 into thread engagement with nut member 5A, the gear 20 is allowed to slide in the longitudinal direction of the main frame for positional change and can be positionally fixed accordingly. A pair of cover plates 24 projecting inwardly from the inner side of a lower portion of the base plate 22 are connected together at the lower ends thereof by a connecting plate 25. The base plate 22 is formed in a lower portion thereof with a bearing hole 26 for receiving one end of a transversely extending support shaft 27, which shaft 27 is pivotally movable about the bearing hole 26. Transversely extending open grooves 24a are formed in respective lower portions of the cover plates 24 at opposed sides thereof. An L-shaped plate 28 of resin material consisting of a transverse plate portion 28a and a vertical plate portion 28b is mounted in the support frame 21 by inserting opposite edges of the transverse plate portion 28a into the grooves 24a, then securely fixing same in position. The other end of the support shaft 27 is fitted in a vertically extending recessed portion 29 formed in the vertical plate portion 28b, whereby the vertical pivotal movement range of the support shaft 27 is regulated.

A sprocket 30 is rotatably mounted on each support shaft 27, with a transmission roller 31, as one example of transmission element, fitted on a protruding boss portion of the sprocket 30, so that the sprocket 30 and transmission roller 31 are integrally rotatable. The transmission roller 31 is urethane rubber made and is movable toward and away from a lower periphery of a corresponding idler roller 11A into and out of peripheral contact therewith. An air-operated cylinder unit (one example of a vertically moving device) 32 for bringing the transmission roller 31 into and out of such contact is interposed between a cylinder rubber pad 33 attached to the other end of the support shaft 27 and the transverse plate portion 28a of the L-shaped plate 28. An inwardly projecting backing plate 35 is fixed by a bolt 34 to a medial portion of the vertical plate portion 28b of the L-shaped plate 28, and a compression spring 36 for biasing the support shaft 27 downward is interposed between the underside of the backing plate 35 and the top side of the cylinder rubber pad 33.

The vertical plate portion 28a of each L-shaped plate 28 is substantially flush with the base plate 22, with idler rollers 11A mounted between respective upper ends of the vertical plate portion 28b and the base plate 22. Each idler roller 11A comprises a roller portion 12a of a smaller width and a boss portion 12b of a larger width and is free-rotatably fitted on a corresponding roller shaft 13 through the boss portion 12b. Washers 14 are fitted on the roller shaft 13 at opposite sides of the idler roller 11A. The base plate 22 is formed at the upper end thereof with a locking recess 37, and likewise the vertical plate portion 28b is formed at the upper end thereof with a locking recess 38. Idler rollers 11A can be mounted in position by bringing respective opposite ends of individual roller shafts 13 into engagement with the locking recesses 37, 38.

A drive device interlocked to individual transmission gears 20 comprises a chain 45 held in mesh with individual sprockets 30, a drive chain wheel 46 for having the chain 45 trained in position, driven chain wheels 47, guide chain wheels 48, and a motor 49 drivingly connected to the drive chain wheel 44. The chain 45 is supported and guided by guide rails 9, 10.

Figure 3:
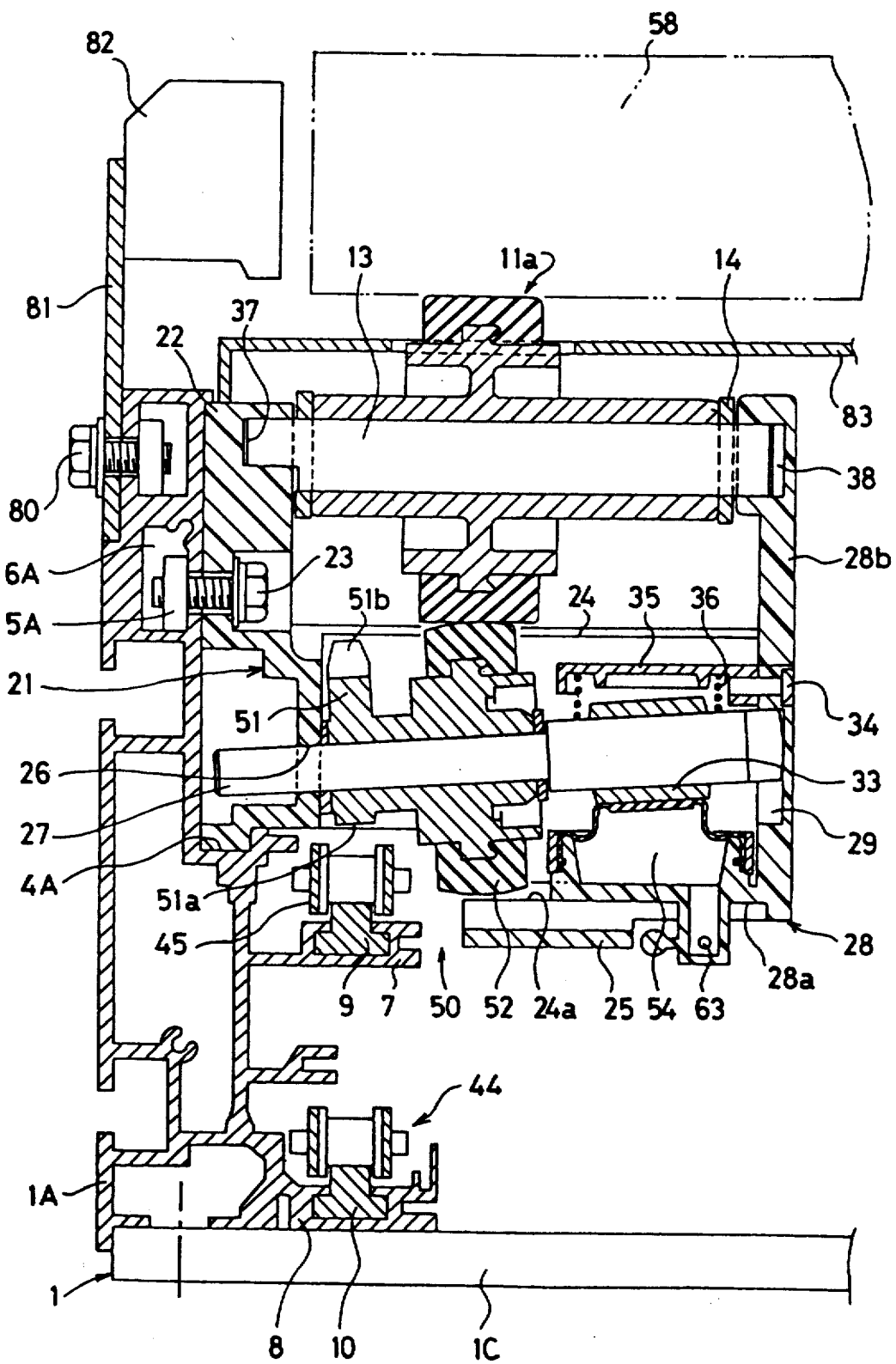
FIG. 3 is an enlarged sectional view showing a braking unit and the perimeter thereof in the roller conveyor.

Each braking unit 50 is of same construction as each transmission gear 20, excepting those parts which are described below. As FIGS. 3 and 4 shown, a non-passive chain wheel 51 is free-rotatably mounted on a corresponding support shaft 27, with a urethane rubber made brake element 52 fixedly attached to a protruding boss portion of the non-passive chain wheel 51. The non-passive chain wheel 51 has a partially toothed configuration such that about one half circumferential portion thereof is a non-toothed portion 51a which is opposed to the chain 45. The remaining toothed portion 51b is adapted for engagement by a stopper element 53 which is removably insertable into a support tube portion formed in the base plate 22. Reference numeral 11a designates an idler roller adapted for contact by brake element 52, and reference numeral 54 designates a cylinder unit for moving support shaft 27 upward.

As shown in FIG. 1, each idler roller 11B at the other side is mounted in position at the upper end of the bracket 17 through a roller shaft 15 and a fixing element 16. The bracket 17 is fixed to the side frame 1B by being engaged at its lower end by the guide portion 4B and by bringing a bolt 18 extending centrally therethrough into thread engagement with a nut element 5B.

Figure 5:
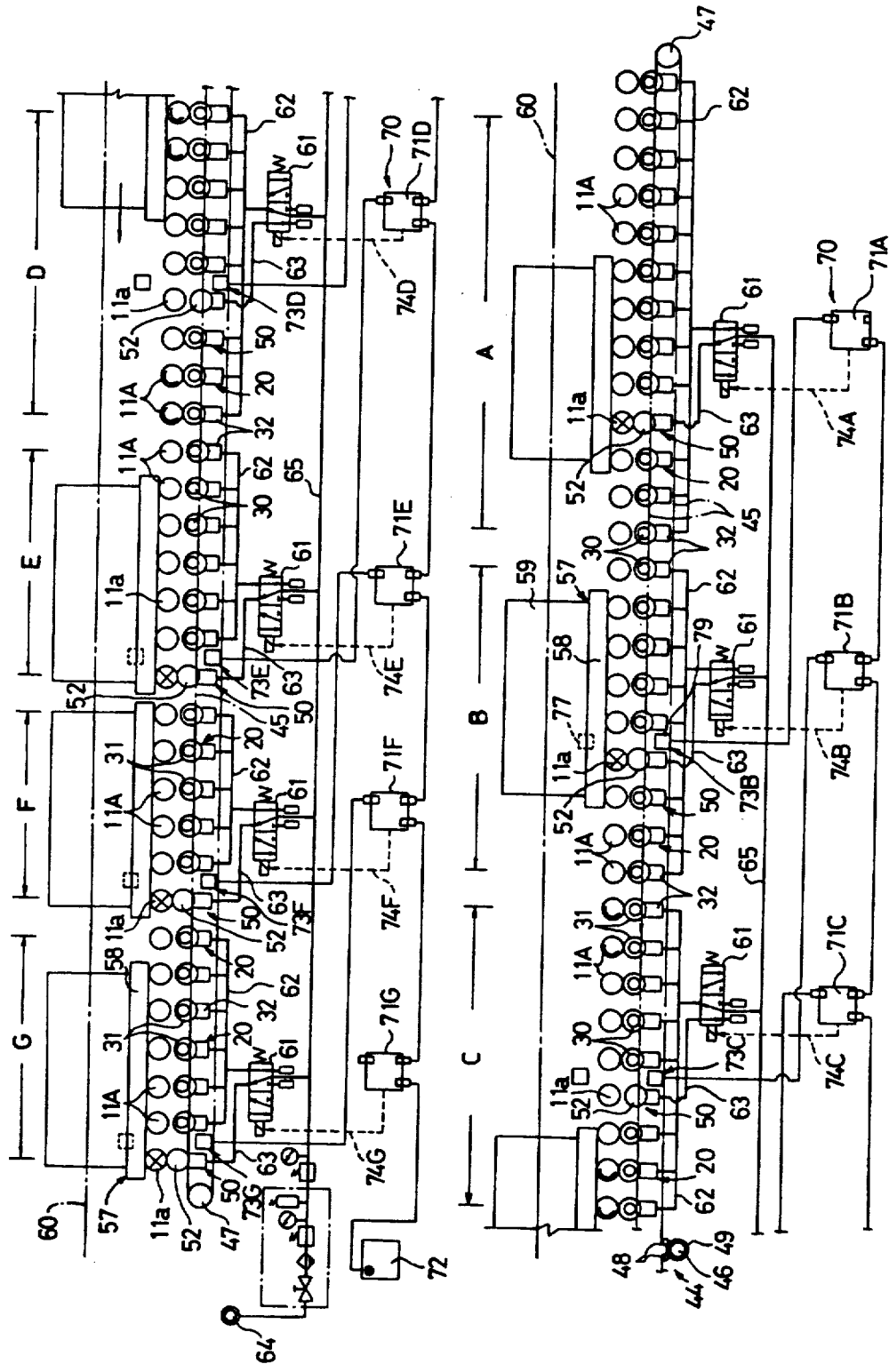
FIG. 5 is a general schematic view in side elevation showing the roller conveyor.

As FIG. 5 illustrates, a conveyance track 60 comprising pluralities of idler rollers 11A, 11B, 11a are divided into a plurality of zones in the direction of article conveyance, that is, into seven zones A to G in order of conveyance from the upstream side toward the downstream side. In each of the zones A to G, at least one idler roller 11a is disposed together with one braking unit 50, and a suitable number of idler rollers 11A are disposed together with transmission gears 20. Connection and disconnection with respect to transmission rollers 31 and brake element 52 are carried out separately for individual zones A through G, and for this purpose there is provided a changeover valve 61 for effecting such connection and disconnection in alternative way. More particularly, a first supply/discharge hose 62 connected to cylinder devices 54 of transmission gears 20 and a second supply/discharge hose 63 connected to cylinder device 54 of brake unit 50 are provided for alternative connection to a supply hose 65 leading a supply source 64 through an electromagnetic type 5-port changeover valve 61.

Each article to be conveyed consists of a pallet 58 and a product 59 placed on the pallet 58. It is noted, however, pallet 58 need not be used.

A control circuit 70 connected to each changeover valve 61 is provided for actuating transmission gears 20 in case where no article 57 is present in the downstream zone of any two adjacent zones as viewed in the direction of conveyance. More particularly, control units 71A, 71B, 71C, 71D, 71E, 71F, 71G are arranged in corresponding relation to the zones A to G; and the control units 71A to 71G are connected to one another and and also connected in series to power supply 72. In individual zones B to G other than the upstreammost first stand-by zone A there are provided goods sensing devices 73B, 73C, 73D, 73E, 73F, 73G, which are in turn connected to the control units 71A to 71F in upstream-side adjacent zones. For example, goods sensing device 73B is connected to control unit 71A, and likewise goods sensing device 73C is connected to control unit 73B. The control units 71A to 71G are so arranged that when the goods sensing device in a downstream zone is in non-detecting state, control signals 74A, 74B, 74C, 74D, 74E, 74F, 74G, whichever may be appropriate, are given to corresponding changeover valves 61 in order to actuate the transmission gears 20 in that particular zone and an immediate upstream zone.

Support plates 81 are mounted to respective top ends of the side frames 1A, 1B by means of a bolt and nut 80 as shown in detail in FIGS. 2 and 3. A guide member 82 is disposed on each of the opposed surfaces of the support plates 81. In FIG. 1, reference numeral 83 designates a cover, and 84 designates a power supply unit disposed between idler rollers 11A and 11B for aging purposes.

Nextly, conveying operation for articles 57 will be explained.

The chain 45 is normally driven by the motor 49 shown in FIG. 5, and therefore all the sprockets 30 which are in mesh with the chain 45 are in rotation about corresponding support shafts 27. In zones C and D, changeover valve 61 is switched for connection to the supply hose 62 of respective first supply/discharge hoses 62 corresponding to the transmission gears 20. Thus, as FIG. 2 shows, each support shaft 27 is pivoted upward against the downward biasing force of compression spring 36 through the stretching movement of the corresponding cylinder device 32, so that each transmission roller 31 is brought in abutment from below against the corresponding idler roller 11A. The transmission roller 31, which is in abutment against a lower peripheral portion of the corresponding idler roller 11A, brings the idler roller 11A into forced rotation. Accordingly, article 57 on the conveyance track 60 is carried by pluralities of idler rollers 11A, 11B and subjected to a conveying force produced through forced rotation of a plurality of rollers 11A on one side, so that the article 57 is conveyed forward on the conveyance track 60 while being guided by guide members 82 at both sides.

At this point of time, in zones C and D, respective second supply/discharge hoses 63 for corresponding brake units 50 are open and accordingly cylinder units 54 are rendered inoperative, so that each support shaft 27 is pivoted downward under downward biasing force of compression spring 36, whereby each brake element 52 is held away from the corresponding idler roller 11a as shown by solid line in FIG. 4. Therefore, no braking action has occurred and corresponding idler rollers 11a are allowed to rotate freely as pallet 58 advances.

In zones A, B, and E to G in FIG. 5, changeover valve 61 is switched for connecting second supply/discharge hose 63 to the supply hose 65. Thereupon, as FIG. 3 shows, support shaft 27 is pivoted upward against the downward biasing force of compression spring 36 through stretch movement of cylinder device 54, so that brake element 52 is brought in abutment against corresponding idler roller 11a from below as shown by phantom line Q in FIG. 4. As a consequence, idler roller 11a is prevented from free rotation and thus article 57 can be prevented from advancing through braking. When brake element 52 is brought in abutment against idler roller 11a in this way, first supply/discharge hose 62 is held open and cylinder device 32 is rendered inoperative; and accordingly support shaft 27 is pivoted downward under downward biasing force of compression spring 36. Thus, transmission roller 31 is separated from idler roller 11A so that a plurality of idler rollers 11A are brought in non-driven state.

The roller conveyor of the invention in which pairs of idler rollers 11A, 11B are arranged in a plurality of sets is basically operated in manner as above described for conveyance of articles 57 thereon, with braking action effected from time to time. In practice, however, changeover valve 61 is switched as required according to the detecting and non-detecting action of goods sensing devices 73B to 73G, for conveyance control.

More particularly, when articles 57 are present in all zones A through G, they are detected by the goods sensing devices 73B to 73G. Thus, as already stated, transmission roller 31 is separated from idler roller 11A so that idler roller 11A is brought in non-driven state, and brake element 52 goes into abutment against idler roller 11a, whereupon individual zones A to G are subjected to braking action. In this condition, electric power is supplied from the power supply unit 84 to pallet 58 through a collector 84 for aging purposes.

After the required aging operation has been ended, any article present in the downstreammost zone G is delivered outward. Then, there is no detection signal issued from the goods sensing device 73G in zone G. Since no article 57 is present in zone G, a control signal 74F is issued from the control unit 71F corresponding to zone F to changeover valve 61 and simultaneously a control signal 74G is issued from the control unit 71G corresponding to zone G to changeover valve 61. Thereupon, the changeover valves 61 are automatically switched for connection of their respective first supply/discharge hoses 62 to the supply hose 65. Accordingly, in zones F and G, brake element 52 is separated and transmission roller 31 is moved for abutment with idler roller 11A so that idler roller 11A goes into driven state, article 57 in zone F being thus conveyed to zone G.

Upon being conveyed to zone G, article 57 is detected by the goods detecting device 73G and accordingly zone G goes into non-driven state. Then, brake element 52 acts upon idler roller 11a so that the article 57 is subjected to braking action. Delivery of the article 57 to zone G results in there being no detection signal issued from the goods sensing device 73F in zone F. Thus, in same way as above stated, zones E and F go into driven state so that article 57 present in zone E is conveyed to zone F. Through repetition of such series of operation, articles 57 on the conveyance track 60 are sequentially delivered forward from one zone to another. It is noted that FIG. 5 shows article 57 in zone C being conveyed toward zone D.

As stated above, idler rollers 11A and 11B are arranged separately at left and right sides. Therefore, idler rollers 11A, 11B can be designed to be of short and light construction even where an article having a large width is to be handled so that the inertial rotational force involved can be minimized. In addition, the invention provides for size reduction of necessary drive unit and main frame 1. Accordingly, it is possible to stop article 57 at desired position without provision of any stopper means. Pallets 58 need not be designed to be of any special configuration. Furthermore, a median space between the idler rollers 11A and 11B as viewd widthwise of the conveyor can be advantageously utilized for placement of an electrical feeder unit 84 and other means for aging and other suitable purposes.

Figure 6:
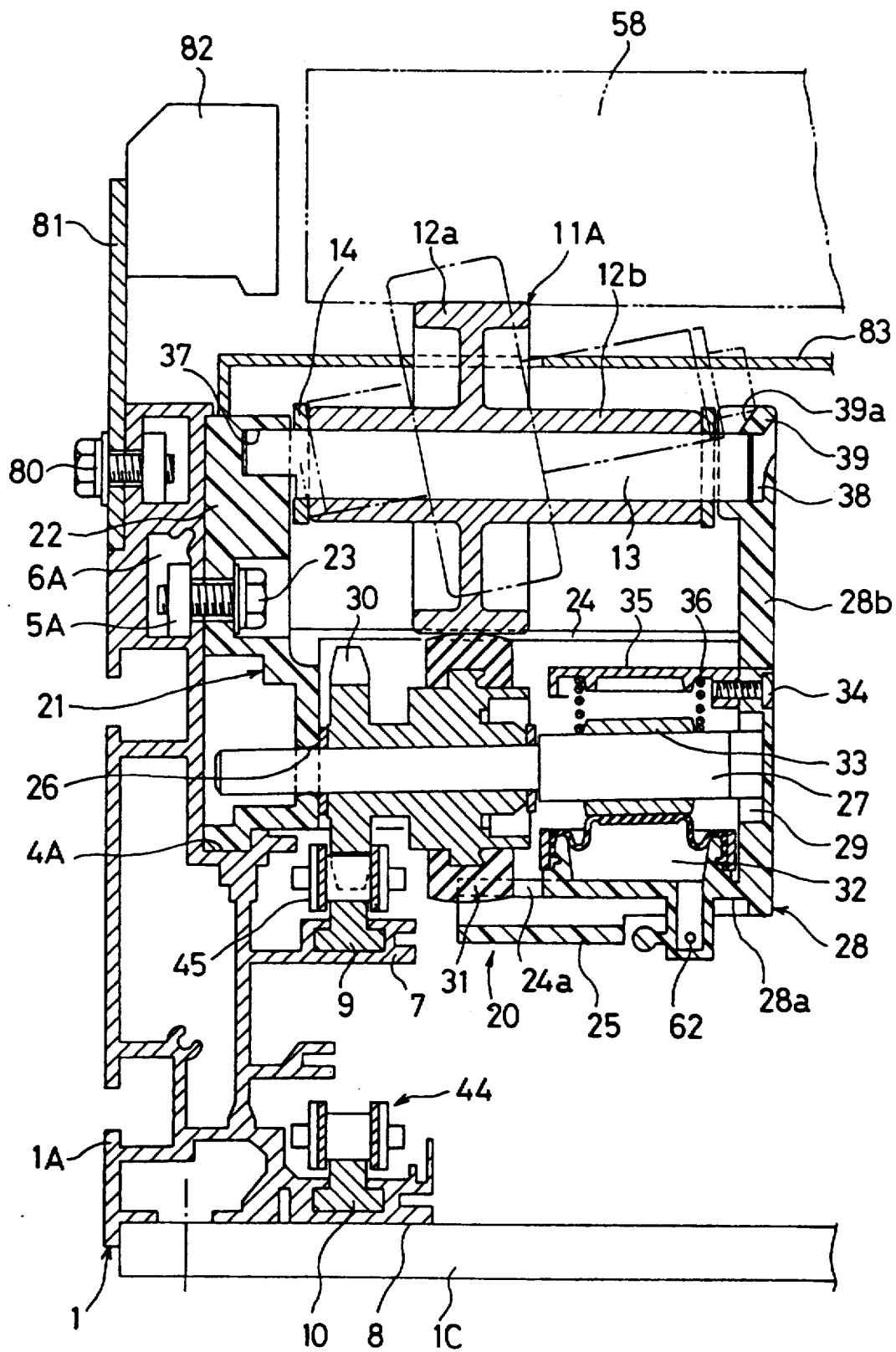
FIG. 6 is a sectional view showing a modified form of the transmission gear.

FIG. 6 shows a modified form of idler roller 11A mounting. In this embodiment, the vertical plate portion 28b of the L-shaped plate 28 is elastically deformable, and the top of the locking recess 38 is covered with a locking piece 39 formed integrally with the vertical plate portion 28b. The locking piece 39 is formed at the top thereof with an inclined guiding surface 39a for easy access to a roller portion 12a.

Accordingly, one end of the roller shaft 13 is brought into engagement with the locking recess 37 and then the other end thereof is pushed down, whereby the vertical plate portion 28b is outwardly elastically deformed under a depressing force acting on the guiding surface 39a so that the other end is guided beyond the locking piece 39 into engagement with the locking recess 38. In this case, by virtue of the elastic recovering force of the vertical plate portion 28b, the locking piece 39 is positioned above the other end of the roller shaft 13 to prevent upward withdrawal of the roller shaft 13. In this way, the idler roller 11A can be mounted in position in one operation. To remove the idler roller 11A, the vertical plate portion 28b is first elastically deformed in a direction away from the roller portion 12a, and then the roller shaft 13 is lifted.

Figure 7:
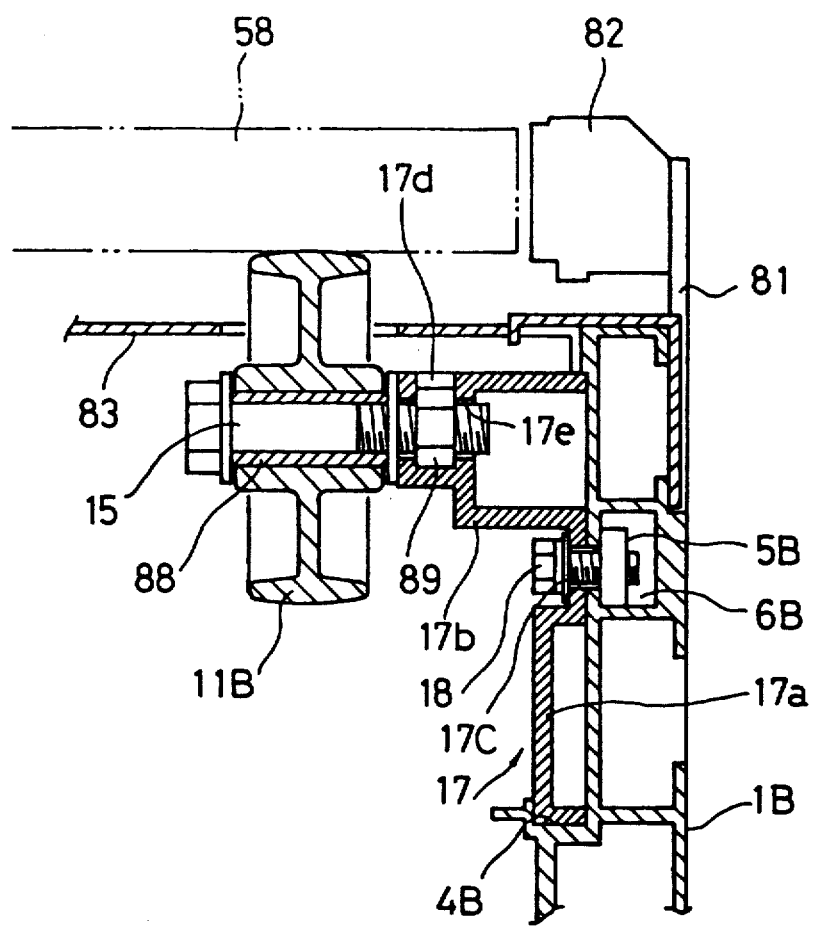
FIGS. 7 to 9 are views showing one of a pair of idler rollers, in a modified form thereof, which is not associated with any transmission gear.
Figure 8:
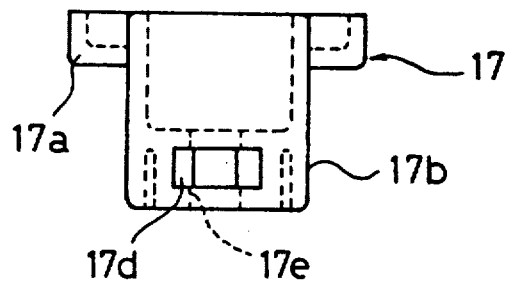
Figure 9:
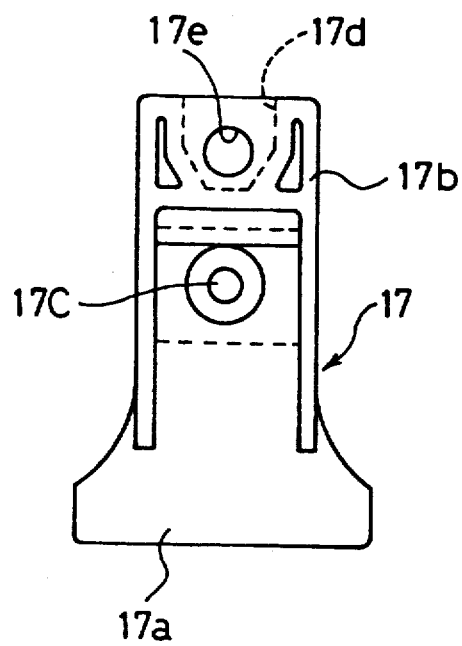

FIGS. 7 to 9 show a modified form of idler roller 11B mounting. In this embodiment, the idler roller 11B is of such arrangement that the roller shaft 15 is freely fittable in the bracket 17 mounted to the main frame 1. The bracket 17 comprises a verically planar base portion 17a and a shaft support portion 17b extending horizontally from the top of the base portion 17a, the two portions being integrally formed with each other. The bracket 17 is fixed to the side frame 1B by bringing the lower end of the base portion 17a into engagement with the guide portion 4B, then bringing a bolt 18 passed through a bolt hole 17c formed centrally of the bracket 17, into thread engagement with a nut member 5B.

The shaft support portion 17b is formed with a top-opened nut-mounting recess 17d, and also with a horizontal through-hole 17e which communicates with the nut-mounting recess 17d. The roller shaft 15 which is inserted centrally through the idler roller 11B via a collar 88 is a bolt engageable threadingly with a nut 89 positioned in the nut-mounting recess 17d.

Therefore, the bracket 17 is mounted in position in the side frame 1B through a bolt 18 or the like, and the nut 89 is dropped down in the nut-mounting recess 17d for being set therein, whereupon one end of the roller shaft 15 passed through the idler roller 11B is passed through the through-hole 17a for thread engagement with the nut 89. In this way, the idler roller 11B can be mounted in position in one operation. To remove the idler roller 11B, the above described procedure is reversed.

As described above, the idler roller 11B can be mounted in and removed from the main frame 1 by fitting the idler roller 11B in and removing from the bracket 17. This provides for easy and quick set up and repair of the idler roller 11B.

Figure 10:
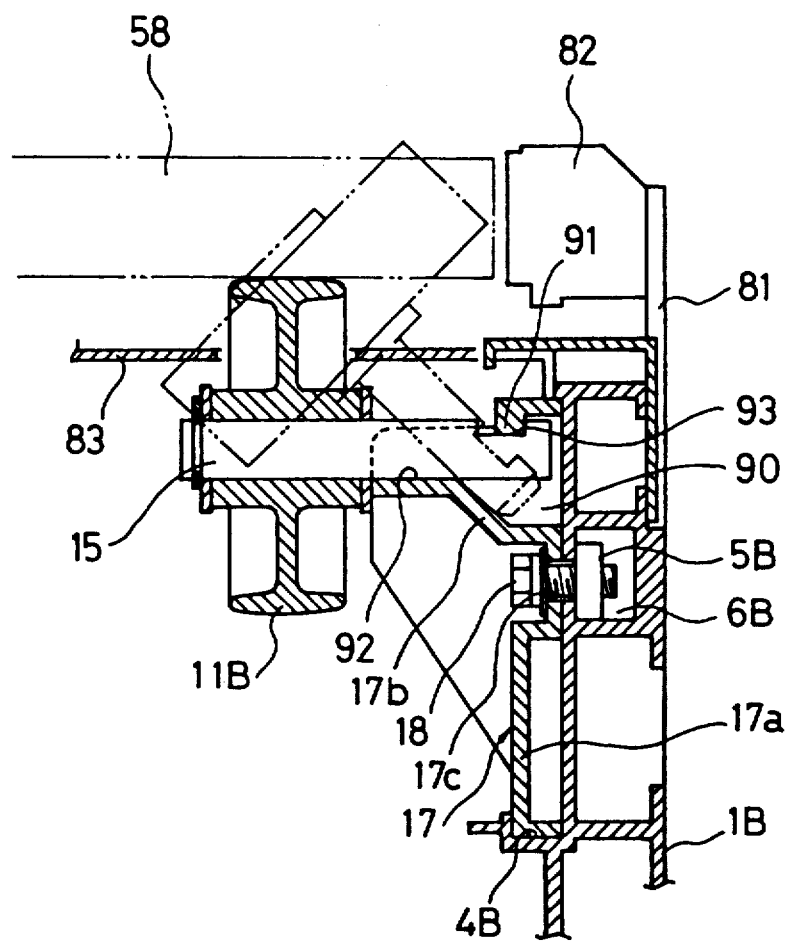
FIGS. 10 to 12 are views showing another modified form of the one idler roller which is not associated with the transmission gear.
Figure 11:
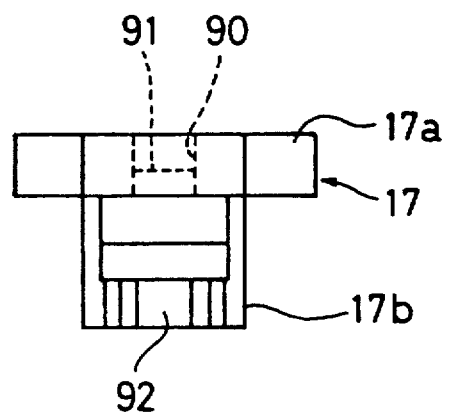
Figure 12:
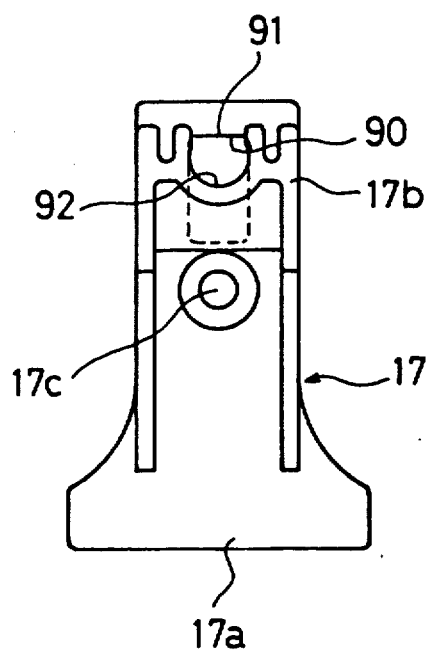

FIGS. 10 to 12 show another modified form of idler roller 11B mounting. In this embodiment, the base portion 17a of the bracket 17 is formed at its top with a transverse through-portion 90. A downward facing edge portion which forms the upper end of the through-portion 90 constitutes a locking portion 91. The shaft support portion 17b is formed with a trough-shaped bearing 92, an edge end of which communicates with the through-portion 90. The roller shaft 15 is formed at its front end with a locking recess 93.

To mount the idler roller 11B, the roller shaft 15 passed through the idler roller 11B is tilted as shown by a phantom line in FIG. 10 so that the locking recess 93 is upwardly oriented and the distal end is down-positioned, and it is inserted from the distal end side into the through-portion 90. The roller shaft 15 is horizontally positioned with the locking recess 93 held in opposed relation to the locking portion 91 as viewed from an obliquely down position. Thus, as shown by solid line in FIG. 10, the roller shaft 15 is fitted in the bearing recess 92, with the locking recess 93 held in lock engagement with the locking portion 91. Hence, the idler roller 11B can be mounted to the side frame 1B in one operation. Removal can be done by reversing the above procedure.

Since the roller shaft 15 is fitted in the bearing recess 92 as it is mounted in position, the shaft 15 is prevented from movement or deflection in the direction of conveyance. Further, because of the fact that the locking recess 93 is locked by the locking portion 91, any transversely rightward withdrawal or rotation of the idler roller 11B can be prevented.

Figure 13:
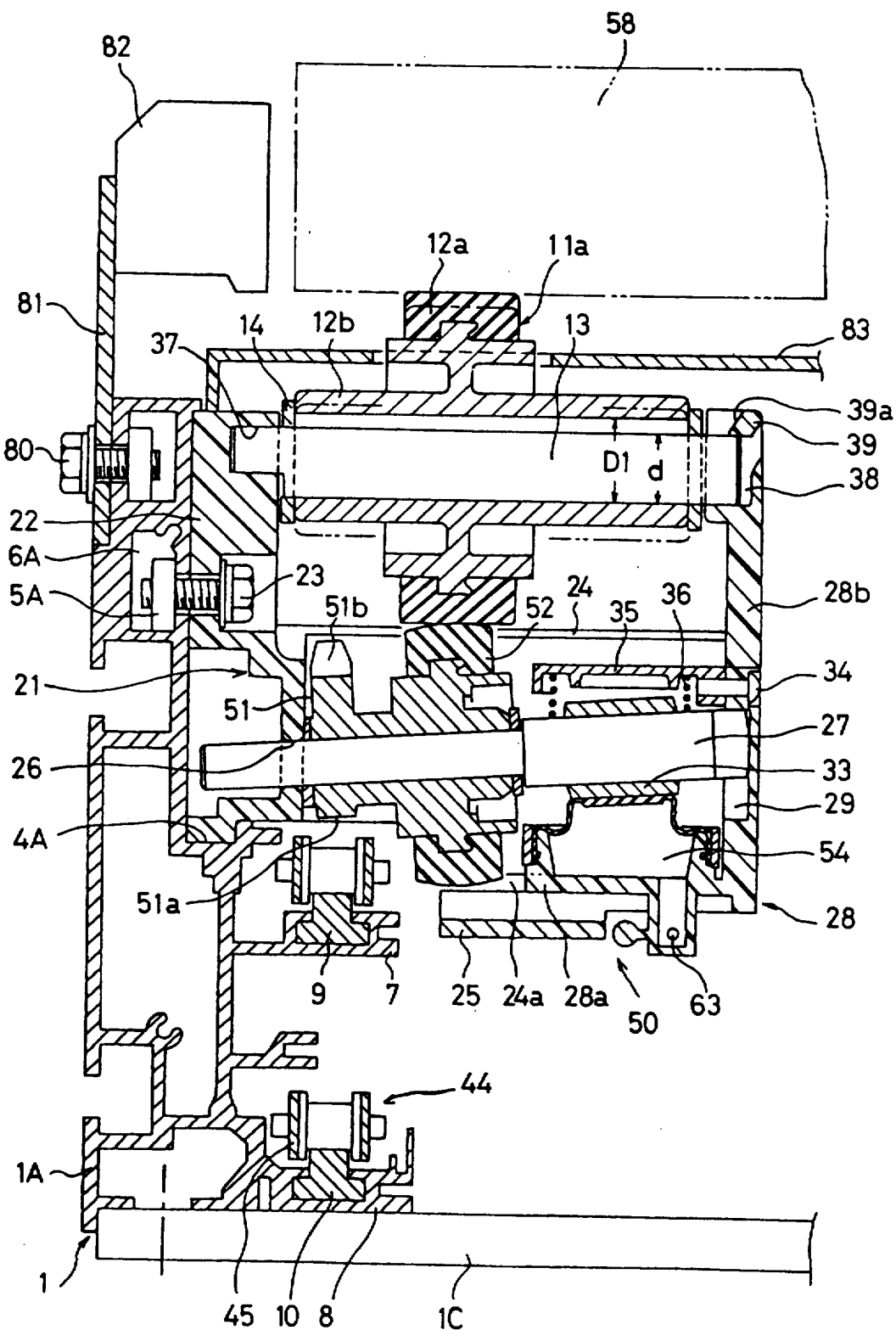
FIG. 13 is a sectional view showing a braking unit in a modified form thereof.

FIG. 13 shows a modified form of the brake unit 50. In this embodiment, the inner diameter D1 of boss portion 12b of the idler roller 11a is set larger than the outer diameter d of the roller shaft 13. Accordingly, the idler roller 11a is well adapted for vertical movement and free rotation in its loose condition relative to the roller shaft 13.

According to such arrangement, when effecting braking action by causing the brake element 52 to abut the idler roller 11a from below, the idler roller 11a moves upward according to the difference between the inner diameter D1 of the boss portion 12b and the outer diameter d of the roller shaft 13 and accordingly the brake can be applied to the article 57 being conveyed in such condition that the upper surface of the idler roller 11a is positioned above that of other idler rollers 11A. Therefore, even when some warpage or irregularity is present on the underside of the article 57, accurate abutment is constantly assured for stopping the article 57.

FIGS. 14 to 19 show a modified form of the main frame 1. In this embodiment, the main frame 1 comprises a pair of side frames 180A, 180B positioned at opposite sides, left and right, a pair of transverse members 181A, 181B connected to respective lower ends of the side frames 180A, 180B and extending inwardly to assume their respective positions in vertically opposed relation, and brackets 182A, 182B connectable to respective distal ends of the opposed transverse members 181A, 181B. The main frame 1 is set at a predetermined level above the floor through a plurality of legs 42 connected to the transverse member 181A which is the lower of the transverse members 181A, 181B.

Figure 16:
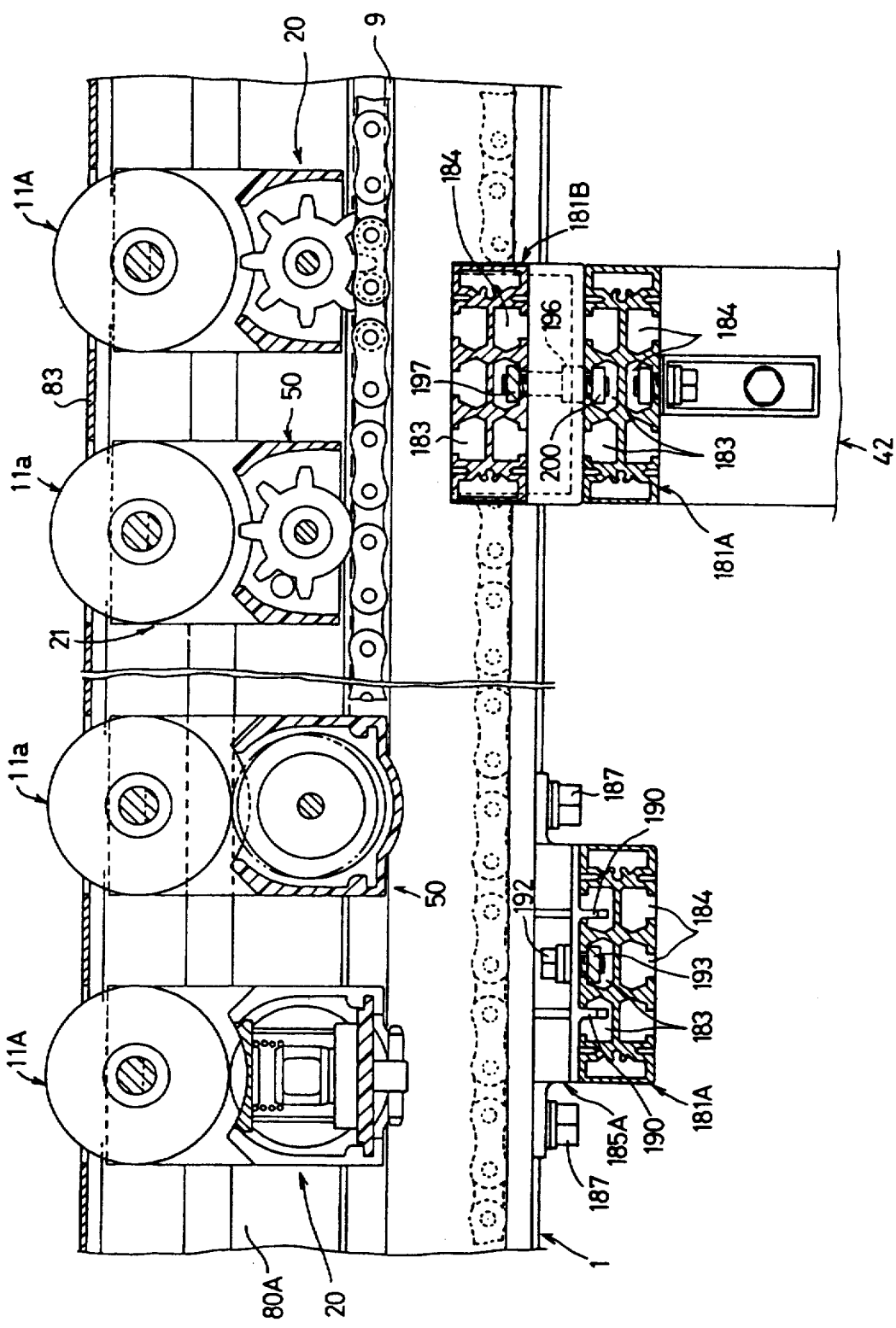
FIG. 16 is a cross-sectional view of transverse members seen in FIG. 14.
Figure 17:
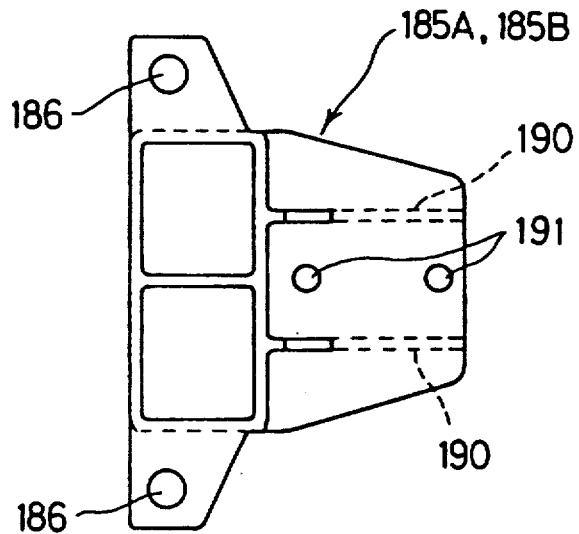
FIG. 17 is a view showing a connecting member for connecting each side frame with the associated transverse member in FIG. 14.
Figure 19:
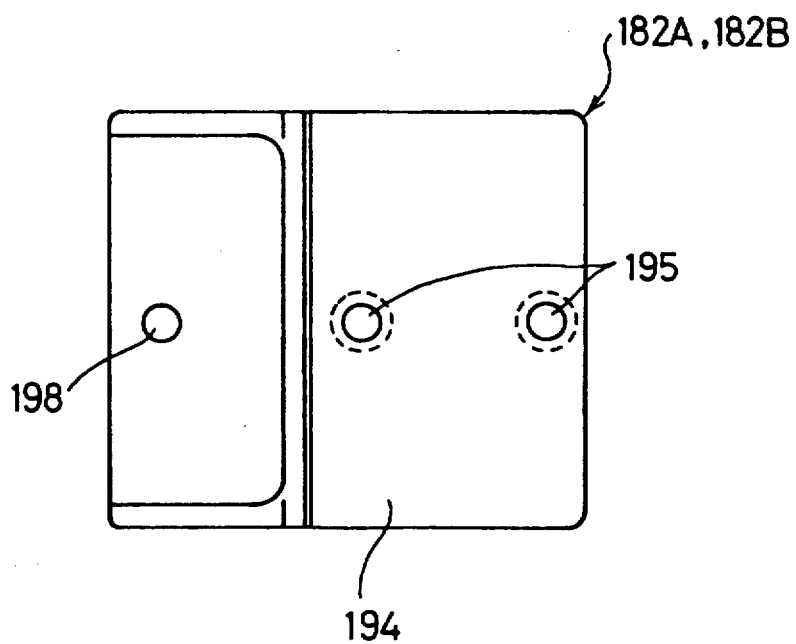
FIG. 19 is a plan view of the bracket shown in FIG. 18.
Figure 18:
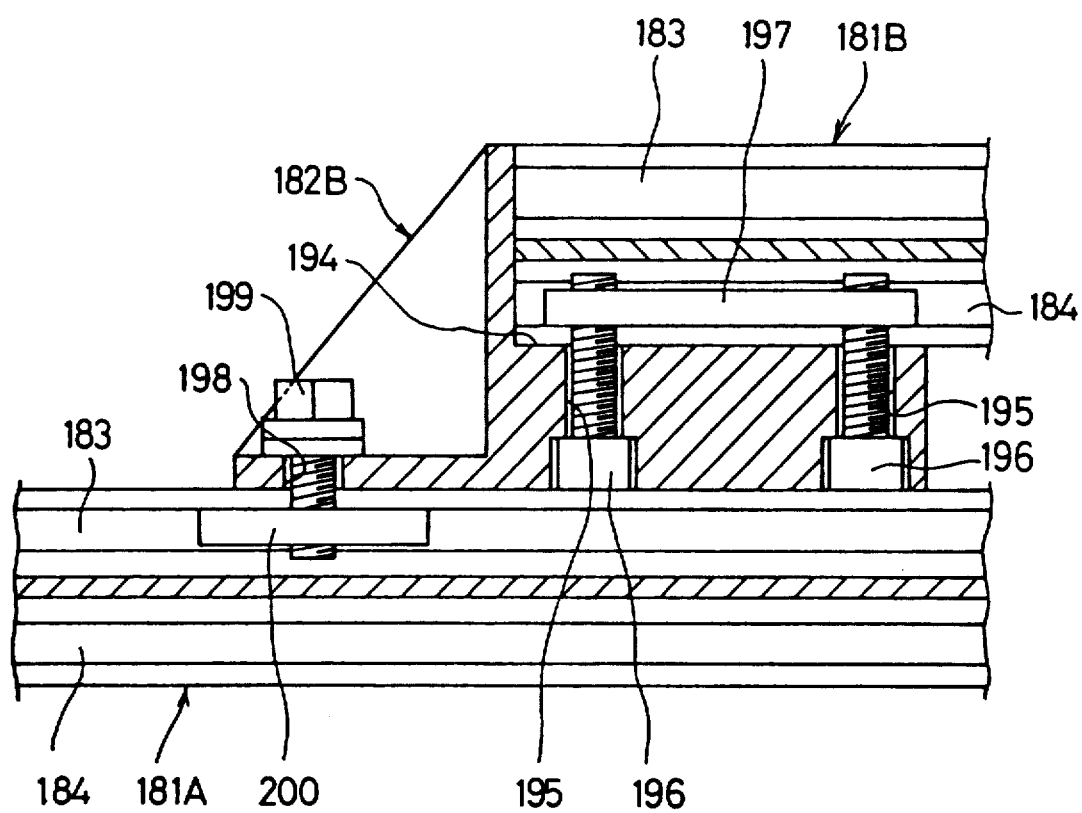
FIG. 18 is a sectional view showing the connection between a bracket and the associated transverse member.

The transverse members 181A, 181B are, as FIG. 16 shows, extruded parts each having three dovetail grooves 183, 184, and their proximal ends are connected to the lower ends of the side frames 180A, 180B through connecting members 185A, 185B. The connecting members 185A, 185B each have a pair of vertical bolt holes 186 which receive a bolt 187 inserted therein from bottom, the bolts 187 being brought in thread engagement with nut elements 189A, 189B disposed in dovetail grooves formed in respective lower ends of the side frames 180A, 180B, whereby the connecting members 185A, 185B are fixed to the lower ends of the side frames 180A, 180B.

An inner portion of connecting member 185A; 185B is adapted to abut the top surface of the connecting member 185A; 185B, and is formed on the underside thereof with positioning projection pieces 190 adapted to fit in dovetail grooves 183 formed at opposite sides in a top portion of the connecting members 185A, 185B. The inner portion of the connecting member 185A; 185B, between the two positioning projection pieces 190, is formed with a pair of vertical bolt holes 191 for receiving a bolt 192 inserted thereinto from above. The respective proximal portions of the transverse members 185A, 185B are fixed to the connecting members 185A, 185B respectively by bringing the bolts 192 into thread engagement with nut elements 193 disposed in the central dovetail grooves 183.

The brackets 182A, 182B each have a stepped portion 194 adapted to abut the end and upper surface, or the end or lower surface, of the end portion of the transverse member 181A; 181B, and a pair of vertical bolt holes 195. Each bolt hole 195 receives a bolt 196 inserted thereinto from above or below. By bringing the bolts 196 into thread engagement with nut elements 197 disposed in the central dovetail groove 183 or 184, the brackets 182A, 182B are fixed to the respective ends of the transverse members 181A, 181B. The brackets 182A, 182B each is formed centrally with a vertical bolt hole 198 which receives a bolt 199 inserted therein from below or above. By bringing the bolts 199 into thread engagement with the central dovetail groove 184 or 183, the brackets 182A, 182B are removably connected to the opposed transverse members 181B, 181A.

Figure 14:
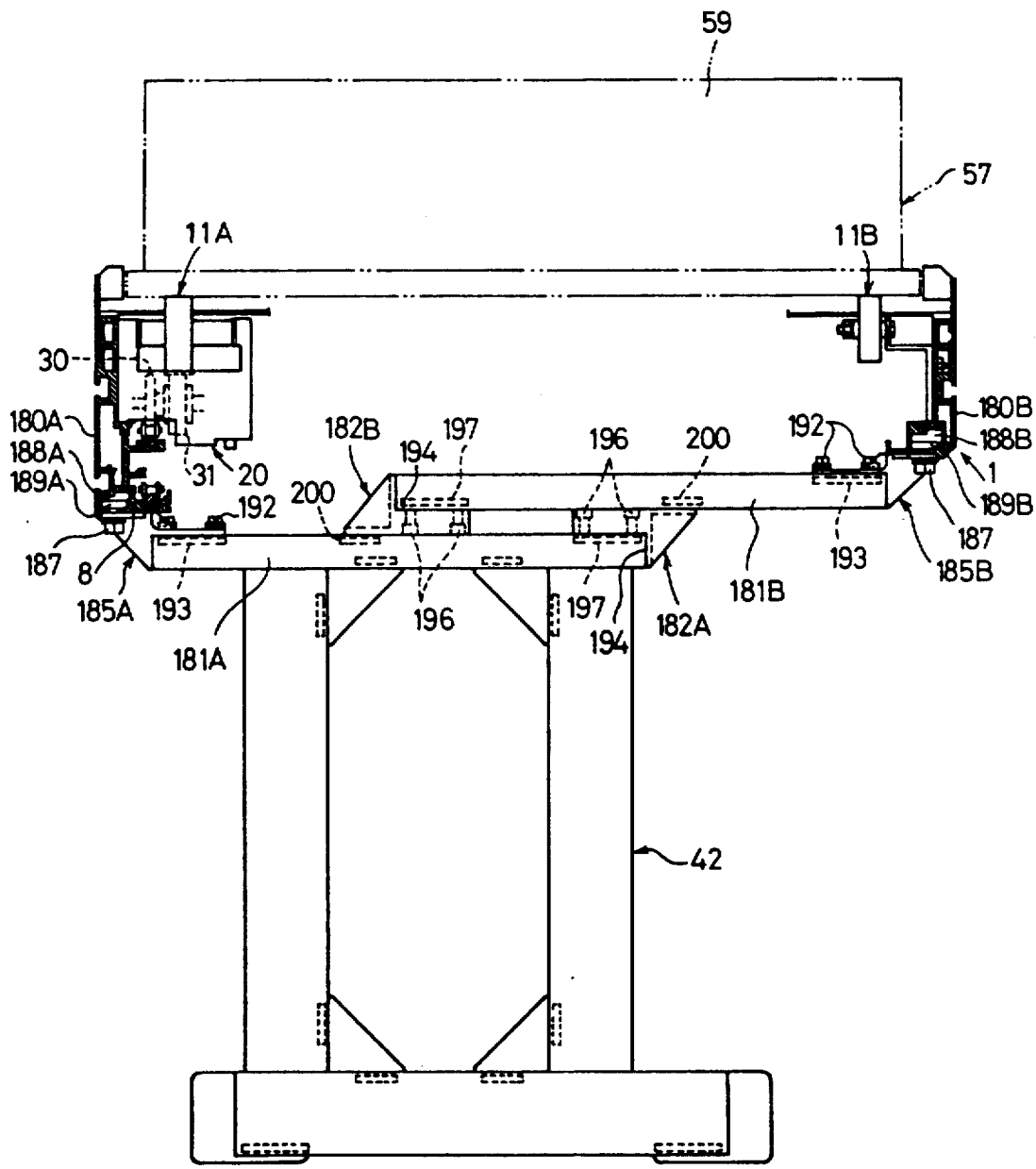
FIG. 14 is a sectional view showing a main frame in a modified form thereof.
Figure 15:
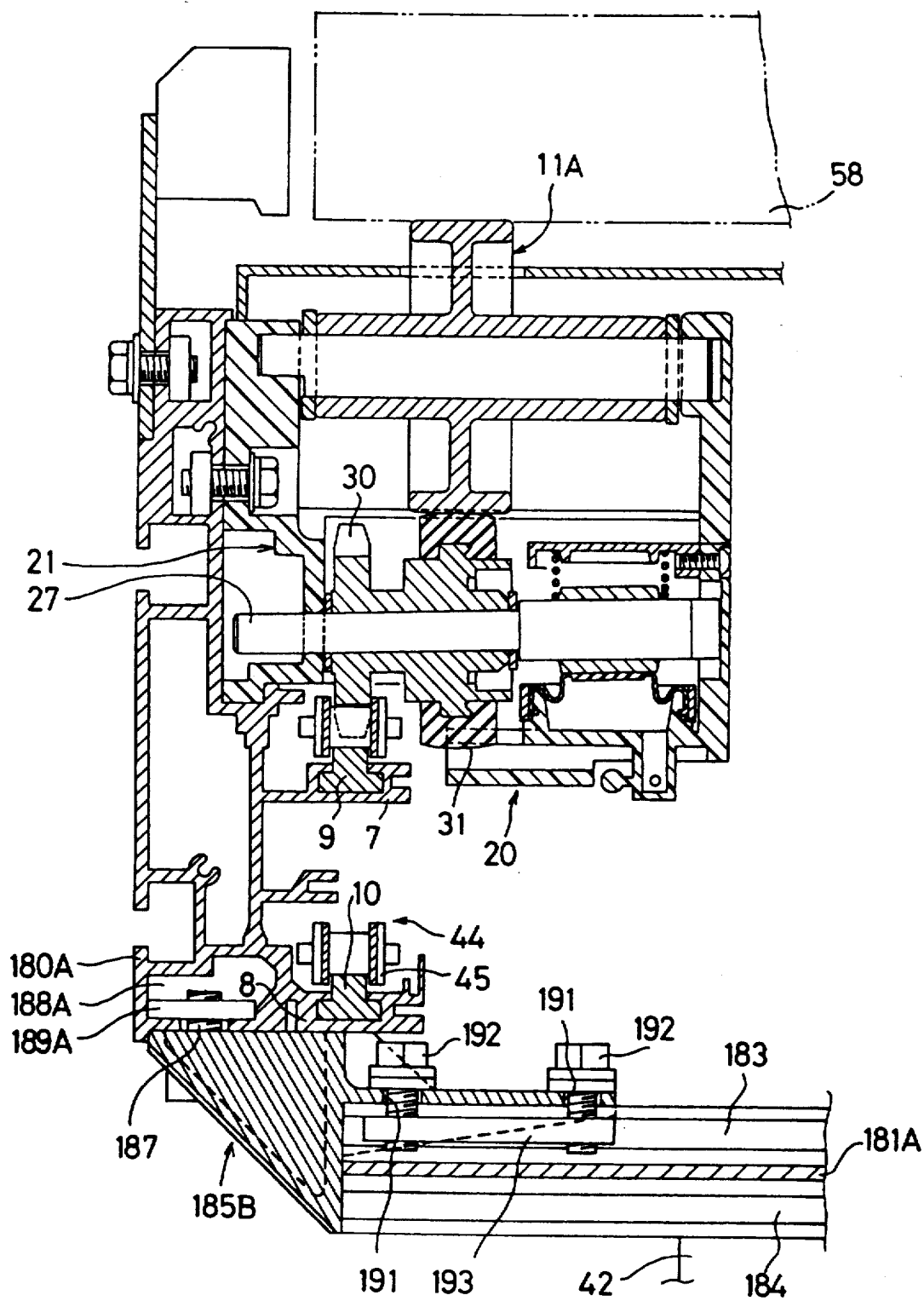
FIG. 15 is a sectional view showing the configuration of a side frame and a transverse member assembled together in the main frame shown in FIG. 14.

According to such arrangement, a multiplicity of idler rollers 11A, 11a are arranged in the one side frame 180A and a multiplicity of idler rollers 11B are arranged in the other side frame 180B; and the ends of the transverse members 181A, 181B connected to the lower ends of the side frames 180A, 180B through the connecting members 185A, 185B are the opposed transverse members 181B, 181A through the brackets 182A, 182B. Thus, the conveyor can be brought in such condition for use as shown in FIG. 14.

Where it is necessary to change the width of the conveyor, the bolts 199 are first loosened thereby to move the side frames 180A, 180B toward or away from each other. In this case, the nut elements 200 are caused to slide within the dovetail grooves 183, 184 respectively. Thus, movement of the side frames 180A, 180B toward or away from each other can be steadily effected. Subsequently, bolts 199 are tightened. In this way, the width of the conveyor can be quickly and easily changed as desired. Since the idler rollers 11A, 11a, 11B are separately mounted to the side frames 180A, 180B, they are positioned according to the changed machine width, there being no need for replacement due to machine width change. Therefore, the entire conveyor can be supplied with considerable cost advantage.

What is claimed is:

1. A roller conveyor comprising:
   a main frame having a left side frame and a right side frame,
   a plurality of first idler rollers carried by one of the side frames,
   a plurality of second idler rollers supported on the other of said side frames so as to form counterparts to said first idler rollers and cooperable therewith to support articles to be conveyed,
   transmission means engageable with and disengageable from said first idler rollers,
   means for supplying a driving force to said transmission means,
   a pair of transverse members connected to the lower ends of the side frames and horizontally extending inwardly from the main frame in vertically juxtaposed positions with respect to each other, said transverse members having ends oppositely extending in overlapping relationship,
   means for releasably securing one of said transverse members to the other of said transverse members for relative adjustment longitudinally of said transverse members, and
   leg means for supporting said main frame associated with the lowermost one of said transverse members.

2. A roller conveyor of claim 1 in which said means for releasably securing one of said transverse members to the other of said transverse members comprises
   bracket means mounted on at least one of said ends oppositely extending in overlapping relationship, said bracket means being adapted to be rendered linearly movable along said other of said transvere members, and
   means for releasably securing said bracket means to said other of said transverse members in selectively varied positions therealong.

3. A roller conveyor of claim 2 in which said bracket means are mounted on both of said ends oppositely extending in overlapping relationship.

4. A roller convey of claim 3 in which said transverse members have upper surfaces and bottom surfaces provided respectively with dovetail groove means, nut elements in said dovetail groove means, and bolts extending through said bracket means and threadedly engaging said nut elements.

5. A roller conveyor of claim 1 further comprising support means mounted on at least one of said side frames, said support means having a shaft support portion comprising opposite sidewalls defining a recess, and a nut in said recess, each of said idler rollers having an axially extending roller shaft journaled in at least the inwardly disposed one of said opposite sidewalls and screwed into said nut.

* * * * *